(12) United States Patent
Lee

(10) Patent No.: US 10,567,390 B2
(45) Date of Patent: Feb. 18, 2020

(54) PEER TO PEER INTERNET OF THINGS ("IOT") VALIDATION SYSTEM

(71) Applicant: Bank of America Corporation, Charlotte, NC (US)

(72) Inventor: Jisoo Lee, Cortlandt Manor, NY (US)

(73) Assignee: Bank of America Corporation, Charlotte, NC (US)

( * ) Notice: Subject to any disclaimer, the term of this patent is extended or adjusted under 35 U.S.C. 154(b) by 199 days.

(21) Appl. No.: 15/935,218

(22) Filed: Mar. 26, 2018

(65) Prior Publication Data

US 2019/0297088 A1 Sep. 26, 2019

(51) Int. Cl.
*H04L 29/06* (2006.01)
*H04L 29/08* (2006.01)

(52) U.S. Cl.
CPC .......... *H04L 63/105* (2013.01); *H04L 63/126* (2013.01); *H04L 67/104* (2013.01); *H04L 67/12* (2013.01)

(58) Field of Classification Search
CPC ... H04L 63/105; H04L 63/126; H04L 67/104; H04L 67/12; H04L 63/107; H04W 12/08; H04W 12/00503
See application file for complete search history.

(56) References Cited

U.S. PATENT DOCUMENTS

| 9,319,404 | B2 | 4/2016 | Svigals |
| 9,485,231 | B1 | 11/2016 | Reese |
| 9,565,192 | B2 | 2/2017 | Chillappa et al. |
| 9,591,016 | B1 | 3/2017 | Palmieri et al. |
| 9,635,000 | B1 | 4/2017 | Muftic |
| 9,699,659 | B2 | 7/2017 | Zehavi et al. |
| 9,699,814 | B2 | 7/2017 | Zakaria et al. |
| 9,716,595 | B1 | 7/2017 | Kravitz et al. |
| 9,729,528 | B2 | 8/2017 | Zakaria et al. |
| 9,785,369 | B1 | 10/2017 | Ateniese et al. |
| 9,794,074 | B2 | 10/2017 | Toll et al. |

(Continued)

OTHER PUBLICATIONS

Conoscenti et al.; "Peer to Peer for Privacy and Decentralization in the Internet of Things", 2017, IEEE, pp. 288-290. (Year: 2017).*

(Continued)

*Primary Examiner* — Matthew Smithers
(74) *Attorney, Agent, or Firm* — Weiss & Arons LLP; Michael A. Springs, Esq.

(57) ABSTRACT

A system for peer to peer validation within a cluster of devices. The system may include the cluster of devices. The system may include a software couple. The software coupler may be configured to couple each device included in the cluster of devices with all of the remaining devices within the cluster. When a transmitting device, included in the cluster, attempts to transmit a request outside of the cluster, the transmitting device may communicate an attempt to transmit the request to the devices within the cluster. The request may include the request, identification of the recipient of the request and payload data to be transmitted with the request. Upon review of the attempt, each device within the cluster may transmit an approval and/or disapproval signal to the transmitting device. The transmitting device may transmit the request to the recipient upon receipt of an approval from a majority of the cluster.

18 Claims, 7 Drawing Sheets

(56) References Cited

U.S. PATENT DOCUMENTS

| | | | |
|---|---|---|---|
| 9,825,921 B2 | 11/2017 | Reese | |
| 9,849,364 B2 | 12/2017 | Tran et al. | |
| 9,875,510 B1* | 1/2018 | Kasper | G06Q 40/12 |
| 10,251,053 B1* | 4/2019 | Paczkowski | H04W 8/22 |
| 2016/0173495 A1 | 6/2016 | Joo | |
| 2016/0248746 A1 | 8/2016 | James et al. | |
| 2016/0259937 A1* | 9/2016 | Ford | G06F 21/554 |
| 2016/0260095 A1* | 9/2016 | Ford | G06Q 20/401 |
| 2016/0337127 A1* | 11/2016 | Schultz | H04W 4/70 |
| 2016/0366181 A1 | 12/2016 | Smith et al. | |
| 2017/0163444 A1 | 6/2017 | McLaughlin et al. | |
| 2017/0289184 A1 | 10/2017 | C et al. | |
| 2018/0253451 A1* | 9/2018 | Callan | H04L 9/3239 |
| 2019/0172566 A1* | 6/2019 | Schulman | G16H 10/65 |
| 2019/0289454 A1* | 9/2019 | Inoue | H04W 12/04071 |
| 2019/0349190 A1* | 11/2019 | Smith | H04L 41/12 |

OTHER PUBLICATIONS

"Securing the Internet of Things: A Proposed Framework," https://www.cisco.com/c/en/us/about/security-center/secure-iot-proposed-framework.html, Mar. 16, 2016.

"Global Hacker Botnet tops 6 million hijacked devices," http://www.computerweekly.com/news/450427023/Global-hacker-botnet-tops-6-million-hijacked-devices, Sep. 27, 2017.

\* cited by examiner

PEER TO PEER INTERNET OF THINGS ("IOT") VALIDATION SYSTEM

FIELD OF THE INVENTION

This invention relates to IoT devices. Specifically, this invention relates to validating communications transmitted by the IoT devices.

BACKGROUND OF THE INVENTION

The Internet of Things ("IoT") may be loosely characterized as the interaction and communication between various physical objects. The physical objects are typically embedded with computing and communication capabilities.

The physical objects, or IoT devices, may include refrigerators, lights, smartphones, smartwatches, computers, laptops, tablets, sinks, hot water heaters, coffee machines, ovens, vehicles, thermostats and any other suitable objects.

Various communications may be transmitted from the IoT devices. At times, the communications may include sensitive or confidential information. Also, IoT devices may become compromised. When an IoT device becomes compromised, the IoT device may transmit confidential information to unauthorized locations. Because IoT devices are interconnected, and may not necessarily be controlled by a central location, it may be difficult to determine when IoT devices become compromised.

Therefore, a system for peer to validation within a cluster of IoT devices is desirable. It would be further desirable for the cluster of IoT devices to validate communications of other IoT devices in order to maintain a checks and balance system on the devices within the IoT cluster.

SUMMARY OF THE DISCLOSURE

A system for peer to peer validation within a cluster of devices is provided. The cluster of devices may include IoT devices. The system may include the cluster of devices. The cluster of devices may be defined based on physical geographic location parameters. The cluster of devices may be defined based on virtual location parameters.

The system may include a software coupler. The software coupler may be configured to couple each device, included in the cluster of devices, with all of the remaining devices in the cluster.

When a device, included in the cluster of devices, attempts to transmit data to, and/or receive data from, a location outside of the cluster of devices, a number of executable actions may be executed prior to transmission and/or receipt of the data. In some embodiments, when a device attempts to change one or more of its own configuration settings and/or modify one or more of its own behavior settings, the number of executable actions may be executed prior to execution of the configuration change and/or behavior modification. It should be appreciated that the behavior modification may be a physical modification on the IoT device itself or a modification implemented remotely. In an alternative, the modification may be implemented by the device on a remote system.

Initially, the attempt to transmit data, receive data, change one or more configuration settings and/or modify one or more behavior settings, may be transmitted to each of the cluster of devices. The attempt may include a recipient and/or sender associated with the attempt. The attempt may include identification of data to be transmitted and/or identification of expected data to be received. The attempt may include identification of the configuration settings to be changed and/or behavior settings to be modified.

Each device within the cluster may transmit an approval or disapproval signal to the device attempting to transmit data, receive data, change a configuration setting and/or modify a behavior setting. The device attempting to transmit data, receive data, change a configuration setting and/or modify a behavior setting may transmit the data, receive the data, change the configuration setting and/or modify the behavior setting upon receipt of an approval signal from at least 51% of the devices within the cluster, exclusive of the transmitting and/or receiving device.

In some embodiments, the device attempting to transmit data, receive data, change a configuration setting and/or modify a behavior setting may transmit the data, receive the data, change the configuration setting and/or modify the behavior setting upon receipt of a customizable and/or context-aware percentage and/or value of the devices within the cluster. The customizable percentage and/or value may be user-defined. The customizable percentage and/or value may be system-defined. Enabling a user-customizable and/or user-configurable peer-validation approval and context aware/sensitive approval process may yield better accuracy and user experience.

For example, if a user changes a configuration setting on a first IoT device that is included within a cluster of IoT devices, and a portion of the cluster's IoT devices are inaccessible because of physical distance, poor network connectivity, power outage or any other suitable reason, the request may be approved based on an authentication from the remaining local, available IoT devices. The local IoT devices may be capable of explicitly approving, disapproving and/or abstaining from granting permission. A device may abstain from granting permission if it does not have enough context-relevant data to approve and/or disapprove the executable action.

The device attempting to transmit data, receive data, change a configuration setting and/or modify a behavior setting may be denied transmission of the data, receipt of the data, change of the configuration setting and/or modification of the behavior setting upon receipt of a disapproval signal from at least 51%, or any other suitable percentage value, of the devices within the cluster, exclusive of the transmitting and/or receiving device.

In some embodiments, the percentage value may be based on a security level associated with the attempt. For example, if the attempt is requested to transfer a large sum of money, a greater percentage value may be required. If the attempt is requested to show information, such as an account balance, a medium percentage value may be required. If the attempt is requested to perform a simple action, such as to turn on a light or play music, a lower percentage value may be required.

The device attempting to transmit data and/or receive data may be quarantined upon denial of a predetermined number of attempts associated with the device.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
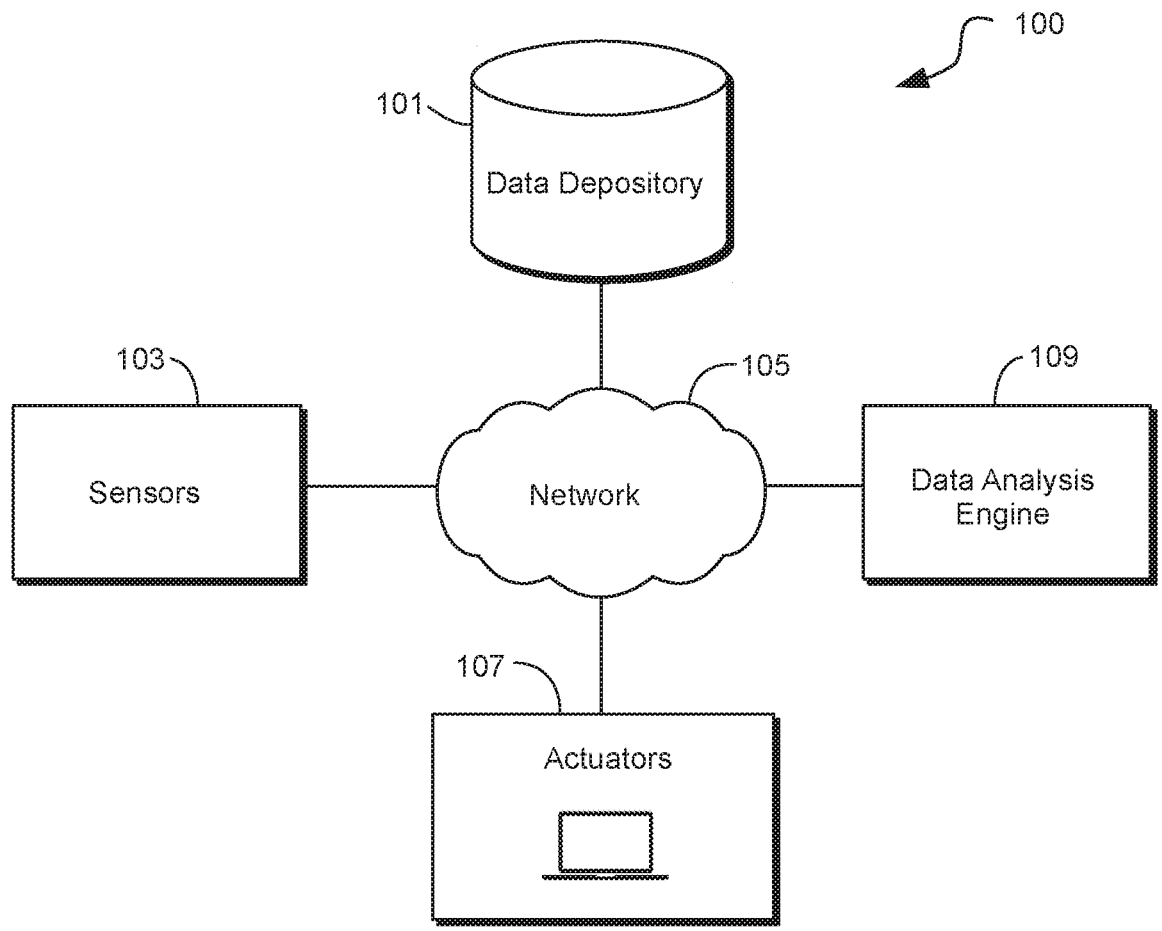
FIG. 1 shows an illustrative diagram in accordance with principles of the invention.

A method for peer to peer validation for use with a plurality of devices is provided. The method may include defining a cluster of devices. The cluster of devices may be selected from among the plurality of devices. The cluster of devices may be defined based on physical geographic location parameters. The cluster of devices may be defined based on virtual location parameters. The cluster of devices may be limited to a predetermined number of devices, such as ten, one hundred or any other suitable number. Once the cluster of devices is defined, a software module comprising cluster software and/or a hardware module comprising cluster software, may be installed on each device included in the cluster. The cluster software may enable communication between devices in the cluster. It should also be appreciated that the cluster software may be included on a hardware module, which can be physically coupled to each IoT device (e.g., universal serial bus).

Another way to form a cluster may be to link any devices that are authenticated using a specific biometric value.

The method may include associating each device, included in the cluster of devices, with all of the remaining devices within the cluster. The associating may be achieved by executing the software module installed on each of the cluster devices. The software module execution may cause the installed software on one device to connect with the installed software on the remaining devices. The software may connect using Bluetooth™, Beacon™, Near Field Communication ("NFC") or any suitable communication protocol. The software may also connect by leveraging the communication protocols of the underlying IoT devices.

The method may include communicating an intention of a requesting device to transmit a future request. The intention to transmit a request may include metadata relating to the request, such as bandwidth requirements of the request transmission, time of the request transmission, any sensitive data included in the request transmission, size of the request transmission, expected data to be received from the request transmission and other suitable metadata. The communicating may be initiated by the requesting device. The requesting device may be included in the cluster of devices.

The method may include receiving an approval and/or disapproval signal from at least 51% of the remaining devices. The method may include transmitting the future request upon receipt of an approval signal from at least 51% of the remaining devices.

The method may include denying the future request upon receipt of a disapproval signal from at least 51% of the remaining devices.

The method may include quarantining the requesting device upon determination that the requesting device communicated three requests that were denied. It should be appreciated that, in other embodiments, a number greater or less than three denied requests may be used to determine device quarantine. A quarantined device may be barred from transmitting an approval and/or disapproval signal.

In some embodiments, a device may be quarantined for transmitting more than a predetermined number of disapproval signals to majority-approved transmissions.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative system architecture 100. Architecture 100 may represent an internet of things ("IoT"). A differentiator between IoT and conventional networks is a traffic profile. In an IoT, nodes may not have defined or known network positions, communication protocols or security services. Solutions that allow architecture 100 to function seamlessly and leverage such disparate components are disclosed herein.

Architecture 100 may include nodes. Each node may include two or more nodes. FIG. 1 shows exemplary nodes 101, 103, 105, 107 and 109. The architecture includes sensors 103. Sensors 103 may include devices that detect changes in a physical or virtual environment. For example sensors may measure audio, rainfall, temperature or water levels. Sensors may measure electronic network traffic, electronic signals (e.g., input or output) or frequency of user logins from within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smart phones, jewelry or refrigerators. Sensors may be relatively inexpensive and have low energy consumption. Sensors may "sense" one or more stimuli or environmental changes.

Sensors may implement one or more functions. For example, sensors may measure changes in their native environment, capture data related to the measured changes store and communicate the captured data. Sensors may be accessed by other sensors or any other node. Sensors may transmit captured data to another node. Sensors may broadcast captured data to one or more nodes.

Captured data may be transmitted using any suitable transmission method. For example, data captured by a sensor may be extracted by a mobile phone. Sensors may leverage a communication link provided by a mobile phone to communicate captured data to another node.

Each sensor may be a node and each sensor may be assigned a unique identifier. For example, sensors may be identified by one or more radio frequency identification ("RFID") tags. The RFID tag may be stimulated to transmit identity information about the sensor or any other information stored on the RFID tag.

Captured data may be transmitted by the sensor and processed far from the location of the sensor that captured the data. For example, captured data may be transmitted from one node to another node until the captured data reaches data repository 101.

Sensors maybe positioned and capture data from diverse locations. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node. For example, a location where data is captured may not have continuous reliable network connectivity. Accordingly, captured data may be stored locally on the sensor for an amount of time prior to transmission or broadcast to another node.

Contextually, captured data may provide information not only about the physical environment surrounding a sensor, but the capturing of data from multiple sensors may provide data that signifies an event. Sensors may be grouped. Sensors may be grouped based on physical proximity or based on the content (or expected content) of data captured. Sensors may be grouped virtually. Other nodes, such as data analysis engine 109 may create and/or be included in such groups. In some embodiments, the captured data may be organized by data repository 101.

Based on data captured from sensors 103, actuators 107 may respond to a detected event. Based on the capture and analysis of multiple sources of data, actuators 107 may be instructed to take action without human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node may operate in a networked environment. A node may be part of two or more networks. A node may support establishing network connections to one or more remote nodes. Such remote nodes may be sensors, actuators or other computing devices. Nodes may be personal computers or servers. Network connections may include a local area network ("LAN") and a wide area network ("WAN"), and may also include other networks. When used in a LAN networking environment, a node may be connected to the LAN through a network interface or adapter. The communication circuit may include the network interface or adapter.

When used in a WAN networking environment, a node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display power must be supplied to the entire backlight, even to illuminate just one pixel in the display. In contrast, an OLED display does not necessarily include a backlight. Furthermore, in an OLED display, preferably, only the illuminated pixel draws power.

The power efficiency of OLED technology presents a possibility for designing nodes that provide enhanced security and functionality. Illustrative devices that may be constructed using OLED technology are disclosed in U.S. Pat. No. 9,665,818, which is hereby incorporated by reference herein in its entirety.

A node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, being executed by a computer. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Sensors in a single architecture or other grouping may be produced by different manufacturers. Sensors may capture data in different formats. For example, sensors may use different data structures to package captured data. Sensors 103 may utilize different communication protocols to transmit captured data or communicate with other nodes. Despite such operational differences, sensors 103 may operate substantially seamlessly together. Interoperability may allow captured data to be substantially seamlessly captured and interpreted by data analysis engine 109. Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at pre-defined intervals such as once a day. Data may also be captured in response to a detected environmental status change.

Data analysis engine 109 may filter data captured by sensors 103. Data analysis engine 103 may repackage or reformat captured data. Data conversion may include transformation of low level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data. "Costs" may be bandwidth-related.

For example, a communication link may be associated with a fixed bandwidth. The bandwidth may limit an amount of information or a rate of transmission over the communication link.

For example, a sensor may respond slowly to a request from another node if there is a large amount of informational traffic traveling on a communication link shared with other nodes. The large amount of informational traffic may not leave sufficient bandwidth for the transmitting node to timely communicate with the requesting node.

As a further example, a sensor may respond slowly if the sensor transmits a large amount of captured data. The large amount of information transmitted by the sensor, together with other informational traffic traveling on the shared communication link, may be close to, or exceed the bandwidth of the communication link. As a result, sensors may be unable to transmit captured date in a timely manner.

Data travelling within architecture 100 to/from nodes may be routed along multiple communication links until the transmitted information reaches a desired destination node (e.g., data analysis engine 109). Each communication link may service a number of connected nodes and a respective volume of informational traffic.

It may be difficult to ascertain available bandwidth on a particular communication link. It may be difficult to ascertain which communication links are being utilized to transmit information between nodes. Nodes attempting to transmit information over a communication link may not be aware of a number of connected nodes, a volume of traffic on a particular communication link or a bandwidth capacity of a communication link.

Furthermore, a communication link may be controlled by a different entity from an entity responsible for operation of a particular node. The entity responsible for operation of the node may be unable to monitor a number of nodes that share a communication link, a bandwidth capacity of a communication link or a volume of traffic transmitted on a communication link. Despite difficult to predict conditions on a communication link, it would be desirable for a node to timely respond to a request for information or timely receive desired information.

Sensors 103 may belong to, or operated by, different administrative/management domains. Sensors 103 may be operated by different domains without expressly-defined relationships among such domains. The absence of express relationships enables access to data captured by sensors 103 by one or more architectures having one or more features in common with architecture 100. Groups of sensors may include sensors from two or more administrative domains.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of information within architecture 100.

Software applications may be implemented on a node. A node may be an enterprise system or a "cloud" of computing devices. On device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 103 and passing captured data to data repository 101 and/or data analysis engine 109.

Software applications may provide security services that mitigate threats to the integrity of data captured by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. For example, actuators 107 may move (translate, rotate, etc.) physical objects or activate/deactivate functionalities of more complex ones. An actuator may dim a light bulb, open a door, change a temperature setting, authorize access to an automated-teller-machine ("ATM") and/or any other suitable functionality. Actuators 107 may verify identities, trigger electronic payments, extend credit or debit accounts.

Within an intelligent networked system such as architecture 100, sensors 103 perform the functions of input devices—they serve as, for example, "eyes," collecting information about their environment. In contrast, actuators 107 act as "hands," implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision and communication processes for actuators 107.

In the absence of express relationships between sensors and the devices that access data captured by the sensors traditional approaches for managing trust, security naming, discovery, or other traditional network services may not be applicable or available. Therefore, a communications system for securing data transmission utilizing a plurality of cross-connect tokens is provided. The communications system may verify the security of a transmission hop path prior to transmission of a communication. At times, IOT devices may be secure at one time, but may become compromised at another time due to various circumstances. Therefore, verification prior to communication may ensure that the security of the communications remains constant.

Generally, nodes of architecture 100 may interact and cooperate using one or more interaction paradigms. Exemplary interaction paradigms include client-server and peer-to-peer interactions. Illustrative communication protocols may include HyperText Transfer Protocol ("HTTP"), Simple Object Access Protocol ("SOAP"), REpresentational State Transfer ("REST") Constrained Application Protocol ("CoAP") or SensorML.

As a result of the disparate nature of sensors 103, an architecture, such as architecture 100 incorporating sensors 103 may support a variety of communication protocols. Illustrative supported protocols may include IEEE 802.15.4 ("ZigBee"), IEEE 802.11, 3G and 4G and LTE. For example, ZigBee requires approximately 20 to 60 mW (for 1 mW transmission power, a range of 10 to 100 meters and a data transmission rate of 250 kbit/s).

To conserve energy, a sensor may communicate wirelessly for short periods of time. Utilizing this approach, one or more standard size single cell cylindrical dry battery batteries (e.g., AA size) may provide requisite computing power and wireless communication for many months.

Communication protocols used by nodes (e.g., sensors or actuators) may not have, or may not be capable of having, security capabilities. A security layer or buffer may be implemented by nodes that receive or rely on data captured by insecure sensors. Sensors or other nodes may be dynamically added or removed from an architecture. A security layer or buffer may be modular to scale quickly and meet growth/contraction requirements.

A physical layer may physically link nodes of architecture 100. The function of this physical layer is to provide communication pathways to carry and exchange data and network information between multiple sub-networks and nodes.

Figure 2:
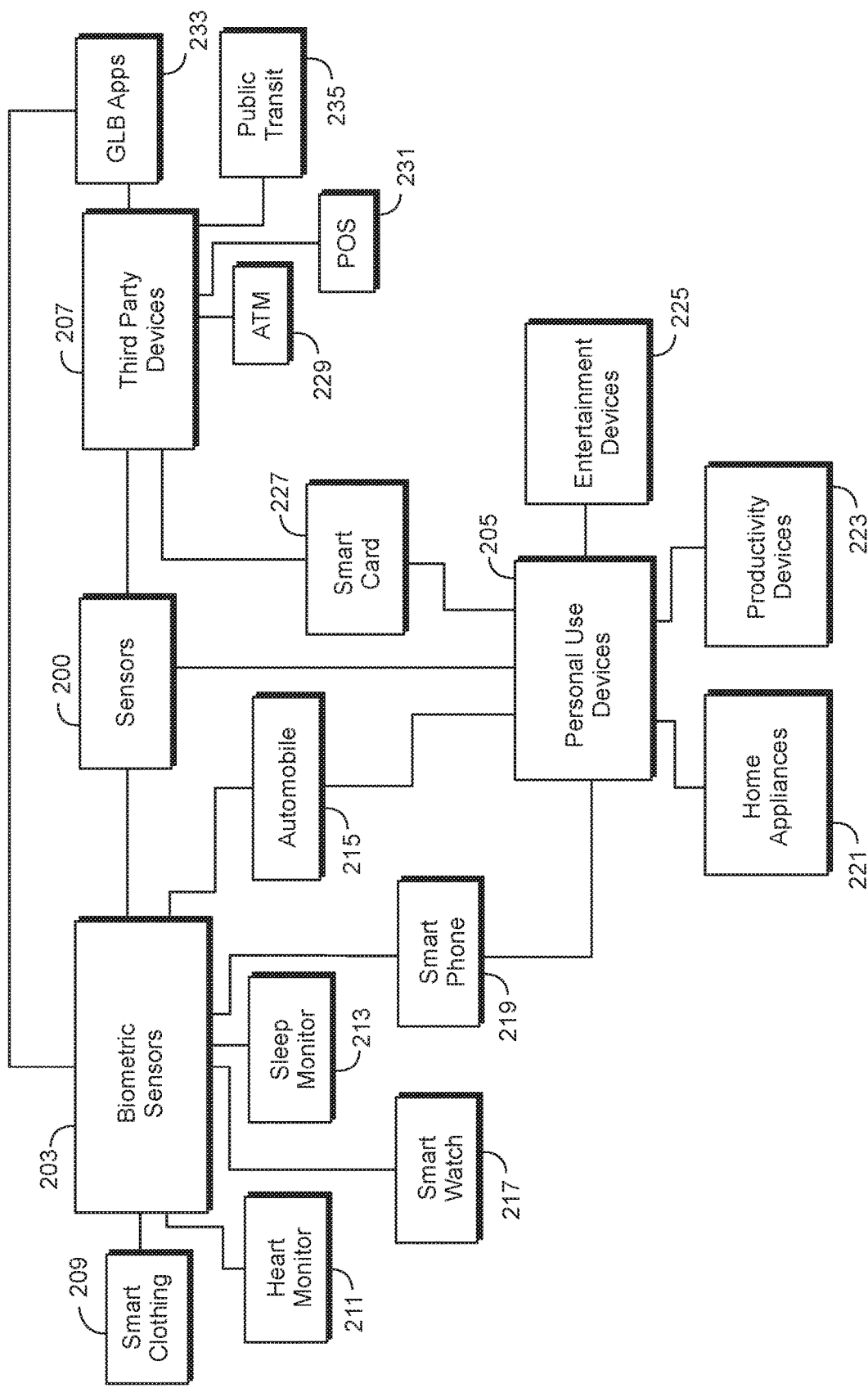
FIG. 2 shows another illustrative diagram in accordance with principles of the invention.

FIG. 2 shows illustrative sensors 200. Sensors 200 may include or more features of sensors 103 (shown in FIG. 1). Sensors 200 include biometric sensors 203 that sense biometric attributes. For example, biometric sensors may be embedded in "smart" clothing 209 that monitors a wearer's physical condition. Such clothing may capture biometric data, such as pulse rate, temperature, muscle contraction, heart rhythm and physical movement. Smart clothing may be linked to smart phone 219 such as via a Bluetooth® communication link. Smart phone 219 may transmit data captured by smart clothing 209 to one or more other network nodes.

Biometric sensors 203 may include other illustrative sensors such as heart monitor 211, sleep monitor 213, smart watch 219, smart phone 219 and automobile 215.

Sensors 200 may include personal use devices 205. Personal use devices 205 may include sensors embedded in home appliances 221, productivity devices 223 or entertainment devices 225. Productivity devices 223 may include tablets, laptops or other personal computing devices. Entertainment devices may include gaming consoles and the like.

Sensors 200 also include third-party devices 207. Third-party devices may include devices that are not under the direct or exclusive control of a user. A user may interact with third-party devices 207 to obtain a desired service provided by the third-party.

Exemplary third party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Suitable purchasing instruments may include a credit card, debit card and electronic purchasing devices. Such purchasing instruments may sense a location or frequency of use.

Such purchasing instruments may include "EMV" chips. EMV is a technology that derives its name from the companies (Europay, MasterCard, and Visa) that helped develop the technology. When the credit card and its associated EMV chip are inserted into a specialized card reader (another sensor), the reader powers the EMV chip and the EMV chip generates a new authorization code each time the credit card is used. The EMV chip may capture transaction data such as amounts, location or identity of the chip reader.

Third-party sensors 207 may include ATMs 229 and point-of-sale terminals ("POS") 231. Such devices may also be actuators.

Third-party devices may also include software applications 233. Applications 233 may be used to access services, such as an online banking portal. Such applications may detect biometric features to authorize access to the online banking portal. Third-party devices may include sensors that capture data associated with power consumption (e.g., smart grids), electronic communication traffic, logistics (package movement) or any other suitable environmental condition.

FIG. 2 shows that sensors may categorically overlap. For example, an application used to access an online bank portal may capture a biometric feature (e.g., fingerprint) to authenticate a user.

Each of the sensors shown in FIG. 2 may include different and possibly incompatible hardware. For example, sensors may each have different operating systems (or none at all), processor types and memory. Sensors 200 may be inexpensive, single-function devices with rudimentary network connectivity. Sensors 200 may be positioned in remote and/or inaccessible locations where human intervention or configuration is difficult.

To conserve power, sensors 200 may utilize 16-bit microcontrollers. Such microcontrollers may use less than 400 µW per MIPS ("million instructions per second") and may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication standards.

Furthermore, because of potentially disparate features and characteristics of sensors 200, security solutions disclosed herein may be used to verify an authenticity of data transmitted by sensors having disparate hardware and software capabilities.

Figure 3:
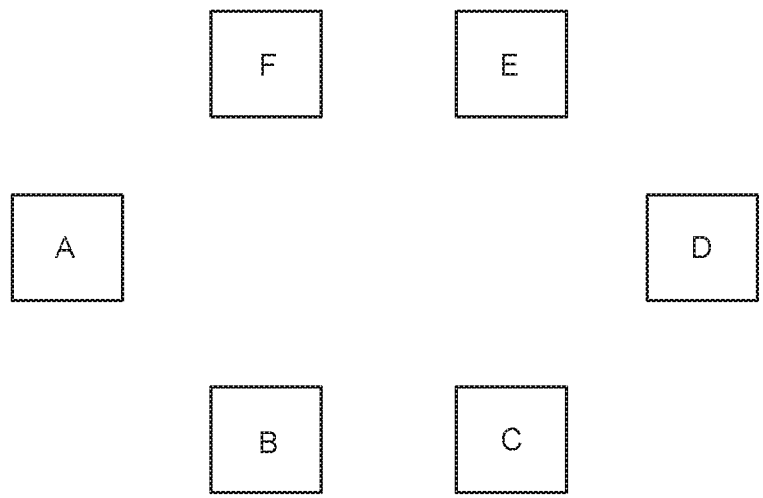
FIG. 3 shows yet another illustrative diagram in accordance with principles of the invention.

FIG. 3 shows IoT devices A, B, C, D, E and F. Each of IoT devices A-F may be various different types of IoT devices, such as those described in connection with FIGS. 1 and 2. Each of IoT devices A-F may be the same types of IoT devices. Devices A-F are not connected with FIG. 3.

Figure 4:
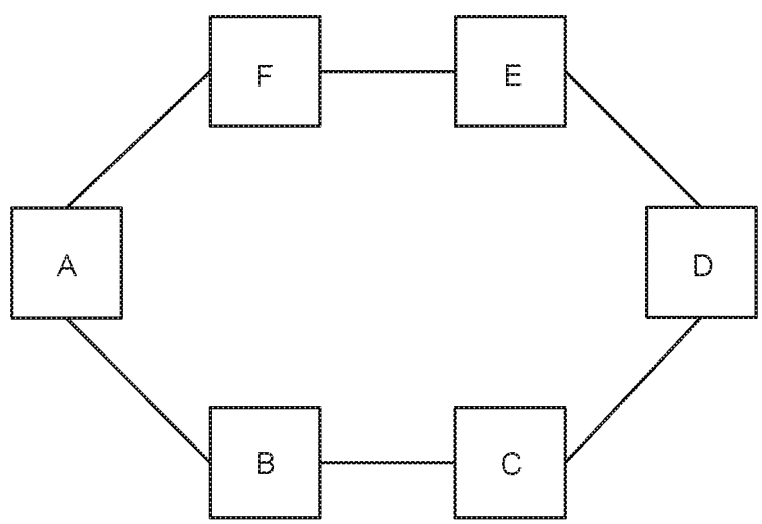
FIG. 4 shows still another illustrative diagram in accordance with principles of the invention.

FIG. 4 shows IoT devices A-F. In FIG. 4, IoT devices A-F may be connected. Each IoT device may be connected to two other IoT devices. As an example, IoT device A may be connected to both IoT devices B and F. In a connected IoT network as shown in FIG. 4, an IoT device may be required to communicate to a third IoT device via a second IoT device. For example, IoT device A may transmit a message to IoT device E via IoT device F or via IoT devices B, C and D.

Figure 5:
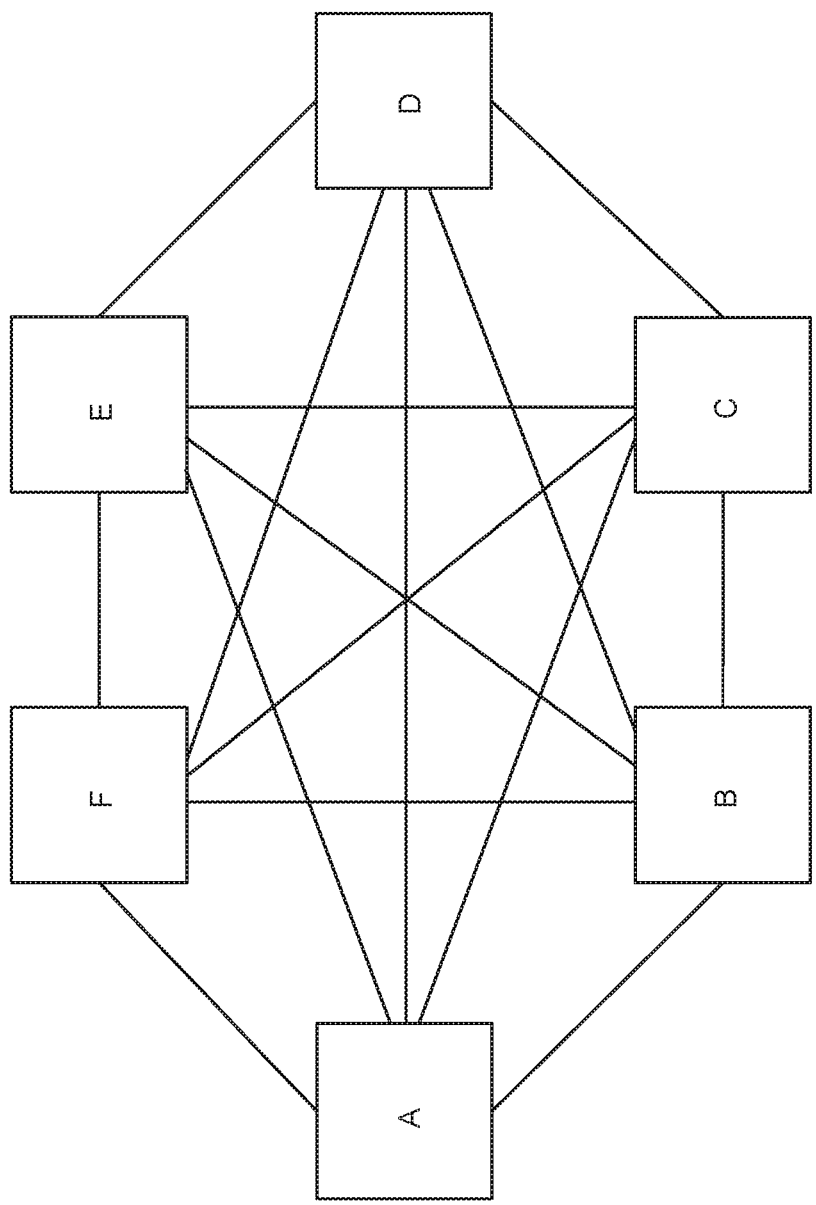
FIG. 5 shows yet another illustrative diagram in accordance with principles of the invention.

FIG. 5 shows IoT devices A-F. In FIG. 5, IoT devices A-F may be connected. Each IoT device may be connected to every other IoT device in the network. Therefore, any IoT device in the network may communicate with another IoT device directly.

Figure 6:
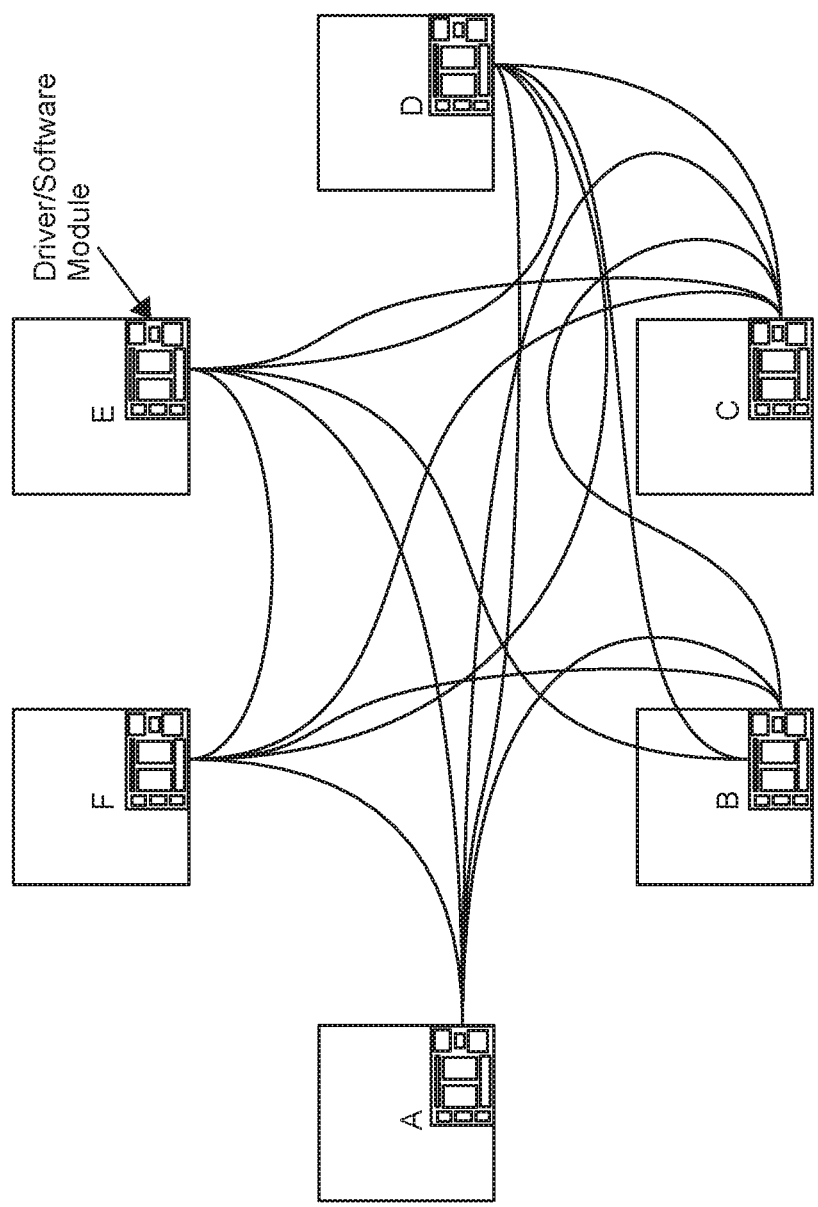
FIG. 6 shows still another illustrative diagram in accordance with principles of the invention.

FIG. 6 shows IoT devices A-F. In FIG. 6, IoT devices A-F may be connected via a driver or software module included in each IoT device. Because all of the drivers and/or software modules are connected to the drivers and/or software modules included in the remaining IoT devices on the network, any driver and/or software module may communicate with another IoT device directly. In some embodiments, the drivers and/or software modules may communicate with a driver and/or software specific medium. In other embodiments, the drivers and/or software modules may communicate leveraging the IoT device's communication protocols.

Figure 7A:
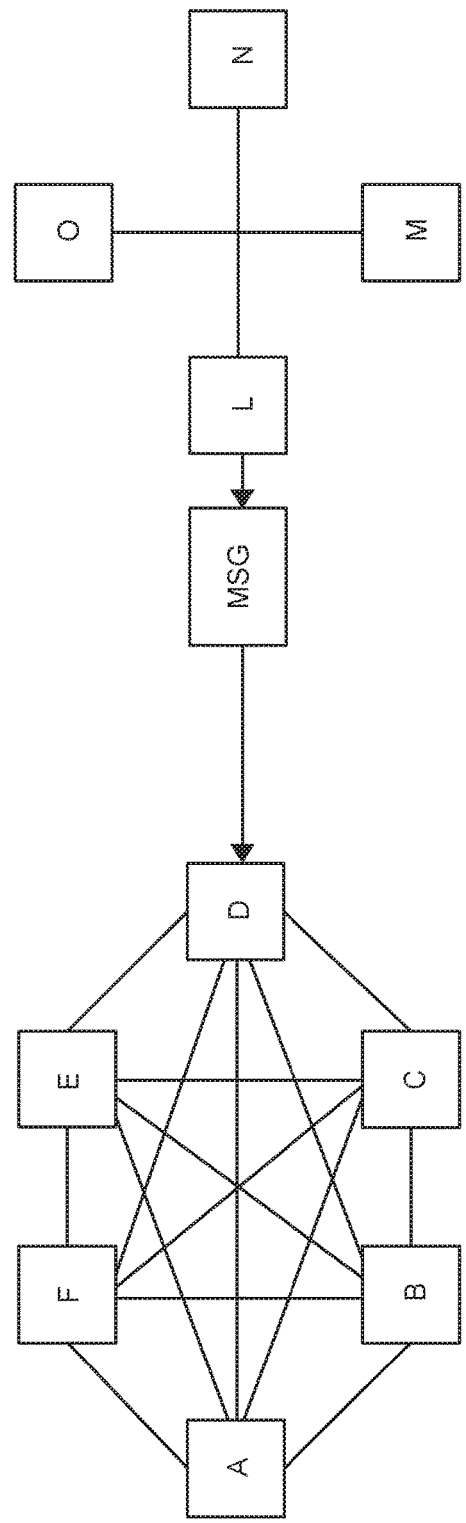
FIGS. 7A, 7B, 7C and 7D show yet other illustrative diagrams in accordance with principles of the invention.

FIG. 7A shows two clusters of IoT devices. One cluster may include IoT devices L, M, N and O. The other cluster may include IoT devices A, B, C, D, E and F. IoT device A may transmit a message to IoT device D.

Figure 7B:
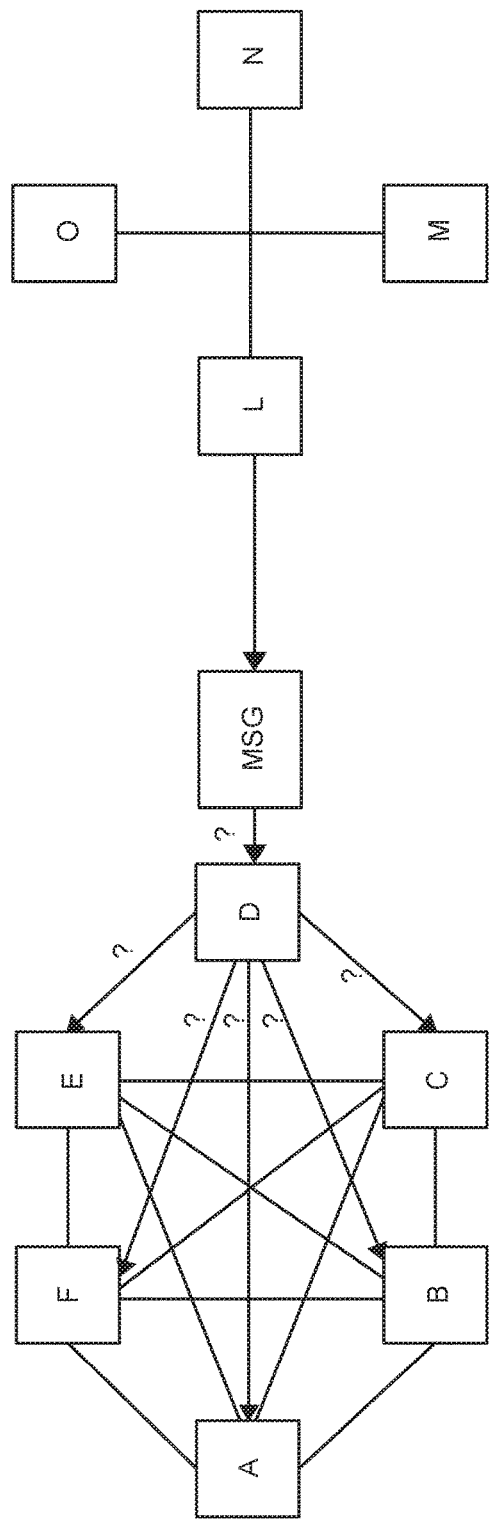

FIG. 7B shows IoT device D receive the message. Prior to IoT device D accepting the message, IoT device D transmits a request to the remaining IoT devices in the cluster (A, B, C, E and F). The request includes metadata relating to the message. The metadata may have been presented to IoT device D prior to the message. The metadata may include message sender data, bandwidth requirements to receive the message and cluster data relating the sender's cluster as well as any other suitable metadata.

Figure 7C:
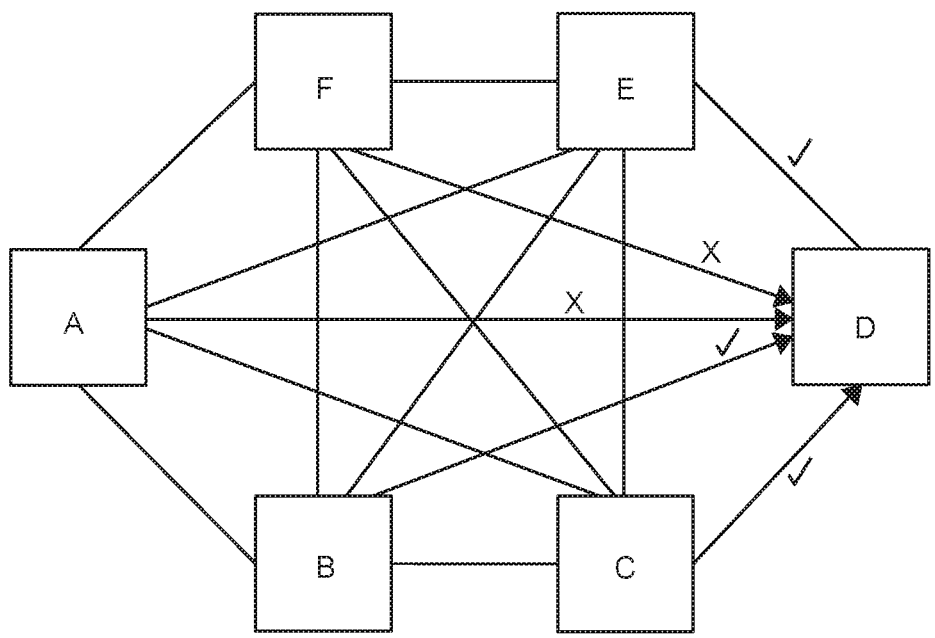

FIG. 7C shows IoT device D receiving approval and/or disapproval signals from the remaining IoT devices within the cluster. IoT devices E, B and C may transmit an approval signal to IoT device D. IoT devices A and F may transmit a disapproval signal to IoT device D. IoT device D may receive approval signals from more than 51% of the remaining devices within the cluster. IoT device D may receive approval signals from 60% of remaining devices within the cluster.

Figure 7D:
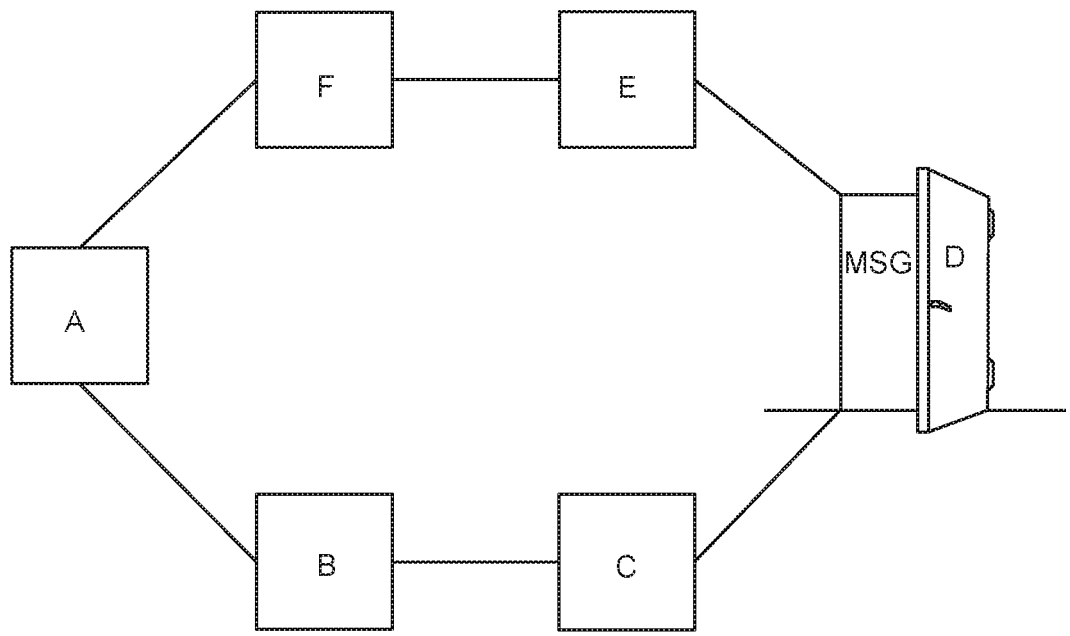

FIG. 7D shows IoT device D accept the message. IoT device D may have accepted the message because it received approval signals from a majority of the remaining devices within the cluster.

Thus, methods and apparatus for a peer to peer IoT validation system have been provided. Persons skilled in the art will appreciate that the present invention can be practiced by other than the described embodiments, which are presented for purposes of illustration rather than of limitation, and that the present invention is limited only by the claims that follow.

What is claimed is:

1. A system for peer to peer validation within a cluster of devices, the system comprising:
   the cluster of devices;
   a software coupler configured to couple each device included in the cluster of devices with all of the remaining devices in the cluster;
   wherein:
   when a device, included in the cluster of devices, attempts to transmit data to, and/or receive data from, a location outside of the cluster of devices:
   the attempt to transmit data and/or receive data is transmitted to each of the cluster of devices, the attempt comprising:
   a recipient and/or sender associated with the attempt; and
   identification of data to be transmitted and/or identification of expected data to be received;
   each device within the cluster transmits an approval or disapproval signal to the device attempting to transmit data and/or receive data;
   the device attempting to transmit data and/or receive data transmits the data and/or receives the data upon receipt of an approval signal from 51% of the devices within the cluster;
   the device attempting to transmit data and/or receive data is denied transmission of the data and/or receipt of the data upon receipt of a disapproval signal from 51% of the devices within the cluster; and
   the device attempting to transmit data and/or receive data is quarantined upon denial of a predetermined number of attempts associated with the device.

2. The system of claim 1, wherein the cluster of devices is defined based on physical geographic location parameters.

3. The system of claim 1, wherein the cluster of devices is defined based on virtual location parameters.

4. A method for peer to peer validation for use with a plurality of devices, the method comprising:
   defining a cluster of devices, said cluster being selected from among the plurality of devices;
   associating each device, included in the cluster of devices, with all of the remaining devices within the cluster;
   communicating, said communicating being initiated by a requesting device included in the cluster of devices, to the remaining devices within the cluster, an intention of the requesting device to transmit a future request;
   receiving, at the requesting device, an approval and/or disapproval signal from at least 51% of the remaining devices; and
   transmitting the future request upon receipt of an approval signal from at least 51% of the remaining devices.

5. The method of claim 4, wherein the cluster of devices is defined based on physical geographic location parameters.

6. The method of claim 4, wherein the cluster of devices is defined based on virtual location parameters.

7. The method of claim 4, further comprising denying the future request upon receipt of a disapproval signal from at least 51% of the remaining devices.

8. The method of claim 7, further comprising quarantining the requesting device upon determination that the requesting device communicated three requests that were denied.

9. A method for peer to peer validation within a plurality of devices, the method comprising:
   defining a cluster of devices, said cluster of devices being selected from among the plurality of devices;
   associating each device, included in the cluster of devices, with all of the remaining devices within the cluster;
   communicating, said communicating being initiated by a requesting device included in the cluster of devices, to the remaining devices within the cluster, an intention of the requesting device to transmit a future request;
   receiving, at the requesting device, an approval and/or disapproval signal from each of the remaining devices; and
   transmitting the future request upon receipt of an approval signal from a majority of the remaining devices.

10. The method of claim 9, wherein the cluster of devices is defined based on physical geographic location parameters.

11. The method of claim 9, wherein the cluster of devices is defined based on virtual location parameters.

12. The method of claim 9, further comprising denying the future request upon receipt of a disapproval signal from a majority of the remaining devices.

13. The method of claim 12, further comprising quarantining the requesting device upon determination that the requesting device communicated three requests that were denied.

14. A system for peer to peer validation within a cluster of devices, the system comprising:
    the cluster of devices;
    a software coupler configured to couple each device included in the cluster of devices with all of the remaining devices in the cluster;
    wherein:
    when a transmitting device, included in the cluster of devices, attempts to transmit a request outside of the cluster of devices:
    the transmitting device communicates an intent to transmit the request to the devices within the cluster, the intent to transmit the request comprising:
    the request;
    identification of a recipient of the request; and
    payload data to be transmitted with the request;
    upon review of the attempt, each device within the cluster transmits an approval and/or disapproval signal to the transmitting device; and
    the transmitting device transmits the request to the recipient upon receipt of an approval signal from 51% of the devices within the cluster.

15. A system for peer-to-peer validation within a cluster of devices, the system comprising:
    the cluster of devices;
    a software coupler configured to couple each device included in the cluster of devices with all of the remaining devices in the cluster;
    wherein:
    when a requesting device, included in the cluster of devices, requests to transmit data, change a configuration setting and/or modify a behavior setting:
    the requesting device communicates to the remaining devices within the cluster:
    the request;

identification of a recipient of the request;
payload data to be transmitted with the request;
the configuration setting and/or behavior setting to be changed and/or modified; and
a security level of the request;

upon review of the attempt, each device within the cluster transmits an approval and/or disapproval signal to the transmitting device when the security level of the request is above a predetermined threshold; and the transmitting device transmits the request to the recipient upon receipt of an approval signal from a system-defined, dynamic percentage value of the devices within the cluster.

16. The system of claim 15, wherein the recipient of the request is the requesting device.

17. The system of claim 15, wherein, when the security level of the request is below a first predetermined threshold, the device processes the request with a second system-defined, dynamic percentage value of the device within the cluster.

18. The system of claim 15, wherein, when the security level of the request is below a second predetermined threshold, the device processes the request without approval from the devices within the cluster.

* * * * *